United States Patent
Huyler

(10) Patent No.: US 7,124,116 B2
(45) Date of Patent: Oct. 17, 2006

(54) METHOD FOR PERFORMING MARKET-ADAPTED PRICE PLANNING

(75) Inventor: William Huyler, McLean, VA (US)

(73) Assignee: HUY-TECH Software Corporation, McLean, VA (US)

(*) Notice: Subject to any disclaimer, the term of this patent is extended or adjusted under 35 U.S.C. 154(b) by 849 days.

(21) Appl. No.: 09/740,004

(22) Filed: Dec. 20, 2000

(65) Prior Publication Data

US 2002/0004789 A1 Jan. 10, 2002

Related U.S. Application Data

(60) Provisional application No. 60/172,592, filed on Dec. 20, 1999.

(51) Int. Cl.
*G06F 17/00* (2006.01)
(52) U.S. Cl. .................. 705/400; 705/1; 705/35; 705/36; 705/400
(58) Field of Classification Search .............. 705/1, 705/20, 5, 14, 16, 23, 26, 400, 10, 35–37
See application file for complete search history.

(56) References Cited

U.S. PATENT DOCUMENTS

| 5,812,988 A | * | 9/1998 | Sandretto ............... 705/36 R |
| 5,822,736 A | * | 10/1998 | Hartman et al. ............. 705/1 |
| 5,987,425 A | | 11/1999 | Hartman et al. |
| 6,078,893 A | * | 6/2000 | Ouimet et al. ............. 705/10 |
| 6,473,084 B1 | * | 10/2002 | Phillips et al. ............. 345/440 |
| 6,954,734 B1 | * | 10/2005 | Kuelbs et al. ............. 705/26 |

FOREIGN PATENT DOCUMENTS

WO     WO 00/52605 A1 * 8/2000

OTHER PUBLICATIONS

Shankar et al., "Customer Price Sensitivity and the Online Medium", Feb. 1999, available at mail3.rhsmith.umd.edu/Faculty/KM/papers.nsf/ 0/4aebcc43c249eaf3852567f4005fa724/$FILE/marriot_wrkg_paper.pdf.*
Kim et al., "Modeling the Distribution of Price Sensitivity and Implications for Optimal Retail Pricing", Jul. 1995, Journal of Business & Economic Statistics, vol. 13, No. 3, available at i.*

* cited by examiner

*Primary Examiner*—John W. Hayes
*Assistant Examiner*—Freda Nelson
(74) *Attorney, Agent, or Firm*—Stites & Harbison PLLC; Ross F. Hunt, Jr.

(57) ABSTRACT

A method for performing market-adapted price planning for a plurality of target products including determining a current price for each target product of the target products, obtaining market prices for a plurality of products competitive to each of the target products, calculating a median price of the market prices for products competitive to each of said target products, associating one of a plurality of product price types with each of the target products, determining a set of pricing parameters for each of the product price types, and determining a potential new price for each of the target products based on the pricing parameters for the product price type associated with the target product and the median price for products competitive to the target product.

13 Claims, 6 Drawing Sheets

METHOD FOR PERFORMING MARKET-ADAPTED PRICE PLANNING

This application claims priority of U.S. Provisional application Ser. No. 60/172,592, filed on Dec. 20, 1999, filed in the name of the same inventor, which is herein incorporated by reference.

BACKGROUND

1. Field of the Invention

The present invention relates to methods for pricing products in a marketplace and, in particular, to a method implemented by a computer for pricing products based on pricing information gathered from the marketplace.

2. Background of the Invention

When making price decisions, it is important to consider market price sensitivity. If sensitivity is high, greater care must be exercised; it is often necessary to price closer to "market." However, market price sensitivity is not easy to measure; its application has heretofore been limited especially in situations where there are a large number, or diversity, of products to be priced.

Automobile service parts are a case in point. An automaker must make discrete decisions about hundreds of thousands of part numbers. In order to make such pricing decisions a manageable task, broad generalizations are often made. In this regard, one popular pricing method is "cost plus," that is, the cost of a product, plus a certain percentage. One drawback to such a method is that it does not predict how the pricing of a particular product, or a particular line of products, is positioned in the marketplace. Thus, the product may be priced way too high, in which case, sales volumes will likely be reduced or the product may be priced way too low, in which case, the manufacturer could probably have made a higher margin on the product.

SUMMARY OF THE INVENTION

The method of the present invention makes large-scale pricing measurement and application practical. The method infers relative sensitivity from the range of current market prices for similar, competing products, culled from surveys. Small price differences imply high market sensitivity and vice versa. Using the difference between approximately the $20^{th}$ and $80^{th}$ percentiles of the price data, rather than absolute highest and lowest competing price, to filter unusually high or low data points (outliers); the size of the band can be varied to in proportion with sample size. In particular, use of the $25^{th}$ and $75^{th}$ percentiles to filter out outliers has provided excellent results.

This can be best visualized by first sorting and graphing the market survey results, as depicted in FIG. 1. First, the prices for the products competitive to each product in a collection of products (typically a product line) are obtained and compiled. Next, the first quartile ($25^{th}$ percentile) and the third quartile ($75^{th}$ percentile) of the prices for the competitive products for each of the seller's products is calculated, sorted and graphed to produce a cone-like graph 100, with the first quartile of the market prices for each product being graphed as line 102 and the third quartile of the market prices for each product being graphed as line 104. The products having little percentage difference between the first and the third quartiles are positioned on the left and those having a greater difference are positioned on the right. Chart 106 depicts the market prices for a particular product at the left end of the cone, and chart 108 depicts the market prices for a particular product at the right end of the cone. It is noted that there is much greater variance among the prices in chart 108. An assumption is made that the pricing of parts toward the left end of the cone (the vertex) has relatively greater price sensitivity; and, those toward the right (open end) has less price sensitivity. Thus, for those on the left, it is better to price closer to market; for those on the right, a seller has more freedom to price at will.

It will be recognized that, although the graphing of the first and third price quartiles may be advantageous, other groupings may be chosen or all of the prices from competitive products may be graphed.

This graphic portion of the present invention can be used to illustrate the drawbacks of the simplified methods of pricing, such as taking the market average of the prices for a particular product and then adding a percentage. Line 110 in FIG. 2 shows where a seller's products would be priced if it simply used 15% over the market average. It is clear that this would produce selling prices that are too high at the left end (more price sensitive products) and unnecessarily low at the right end (less price sensitive products).

In accordance with the method of the present invention, pricing of a seller's products in a manner that more closely fits the cone-shaped curve yields better results because it better tracks market dynamics. Line 112 in FIG. 3 depicts pricing of products that fairly closely tracts the third quartile ($75^{th}$ percentile) of the market prices and line 114 in FIG. 4 depicts pricing of products that fairly closely tracts the first quartile ($25^{th}$ percentile) of the market prices. Where exactly within the cone the seller's products might be priced would likely depend upon how the products are perceived in the marketplace (relative quality, etc.). Thus, the present method makes it practical to measure and apply relative market price sensitivity on a large scale, such as for automobile service parts.

DESCRIPTION OF THE PREFERRED EMBODIMENTS

The method of the present invention is generally implemented through a program that runs on a general purpose computer. However, one of ordinary skill in the art will recognize that the present invention can be implemented in hardware, software, firmware, or any combination of these elements.

Figure 5:
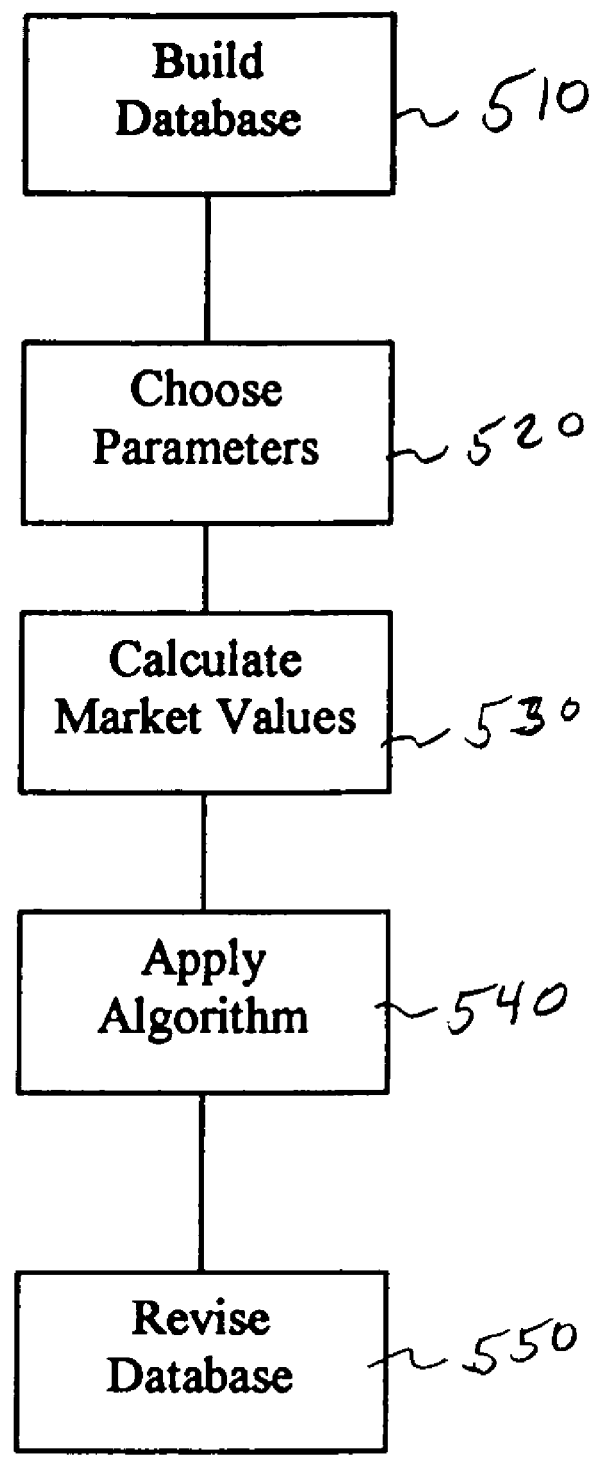
FIG. 5 is a flowchart broadly showing the method of the present invention.

The method of the present invention is illustrated in the flowchart of FIG. 5. Broadly speaking, the method begins with the step of building a database 510. In a preferred embodiment, the database includes the seller's products, along with certain information regarding those products, such as their current prices. The database further includes market prices on products that are competitive with the seller's products. In step 520, certain parameters are chosen to be associated with the seller's products and in step 530, certain market values are calculated to be used in the algorithm of step 540. Advantageously, these parameters and market values are added to the database. The algorithm is applied to arrive at new prices for at least some of the seller's products based on the information in the database and the database is revised based on the new prices (step 550).

The parameters chosen in step 520 include a pricing classification for each product. Each product is classified either as a competitive leader (L), competitive follower (F), captive publicity (P), cost plus (CPL) or a no cost (NC) product. The new price (NP) for a cost plus (CPL) product is simply the cost of the part multiplied by a specified factor and the new price for a no cost (NC) part is zero. A competitive leader (L) part is one that the seller believes should be priced at or near the top of the market for competitive parts and a competitive follower (F) is a part that the seller believes should be priced below the leading competitive parts. A captive publicity part is one for which the seller believes it has a substantially captive market and, therefore, should be priced near the very top of the spectrum for similar type products.

In a preferred embodiment, further parameters include an increase and a decrease switch for each product classification. The increase switch enables the algorithm to increase the current price to a new market-adapted price and the decrease switch enables the algorithm to decrease the current price. If, for example, the increase switch is turned off, then the algorithm will only be capable of reducing prices for products in that classification. These switches are shown as gauges in FIG. 6, which depicts a control panel that is shown on the user's computer monitor. The decrease gauge 610 and the increase gauge 612 for the competitive follower classification is shown in section 602 of panel 600. Similarly, the decrease and increase gauges for the competitive leader and the captive publicity classifications are shown in sections 604 and 606 respectively.

Advantageously, both a high and a low increase factor and a high and a low decrease factor are also provided for each classification. The high factors will be applied when the current price is above the market median price and the low settings will be applied when the current price is below the market median price. While each setting can range from −10 to 10, it has been found that best results are generally obtained when the values are kept between 0 and 2. Example settings are shown on the gauges in FIG. 6. Each gauge is set by clicking on the high and low buttons on either side of the gauge and the choice is depicted both numerically and by the radial dials on the gauges 610 and 612, where a value of 0 is depicted at the "11 o'clock" point on the gauge and each hash mark on the gauge represents a value of 0.5. Of course, various alternative methods and graphical interfaces for choosing and displaying the factors can be implemented. In the simplest embodiment, the factors could simply be set and displayed as text. It is noted that the decrease gauge for the competitive leader classification, gauge 614, has been switched off and this is shown by it being grayed out.

Figure 6:
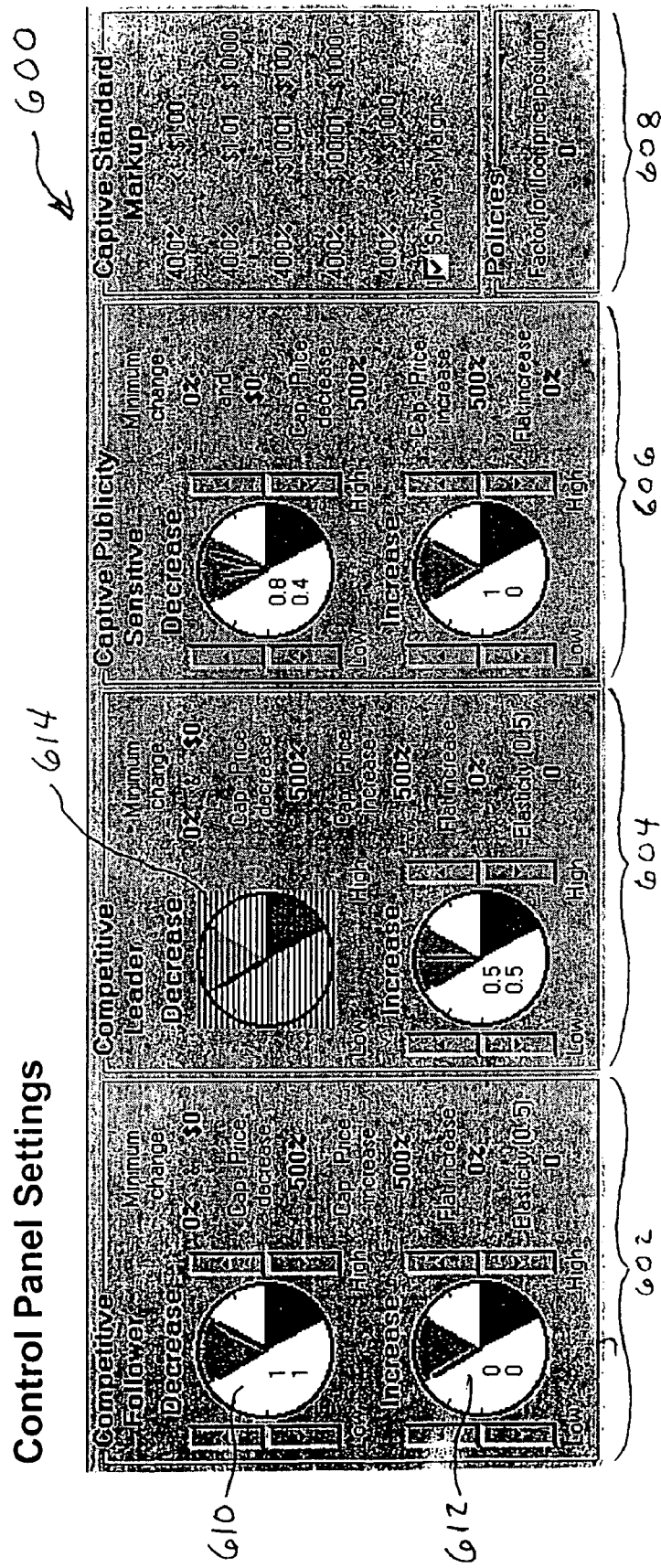
FIG. 6 depicts a portion of a computer screen showing a control panel for controlling one embodiment of the method of the present invention.

In a preferred embodiment, as shown in FIG. 6, each section in panel 600 also displays the minimum and maximum changes selected by the user, as well as the price caps for decrease and increase, and any flat increase chosen by the user. Moreover, section 608 of the panel displays the chosen markups for the captive publicity products, these markups being chosen and displayed with reference to the pricing of the product itself.

As stated above, in step 530, certain market values are calculated from the database to be used in the algorithm. In a preferred embodiment, these market values include the $25^{th}$ percentile (first quartile) price of the competitive products, the median price ($50^{th}$ percentile), and the $75^{th}$ percentile (third quartile) price. Also, an IQR value is calculated which represents the difference between the third quartile and the first quartile prices.

Figure 7:
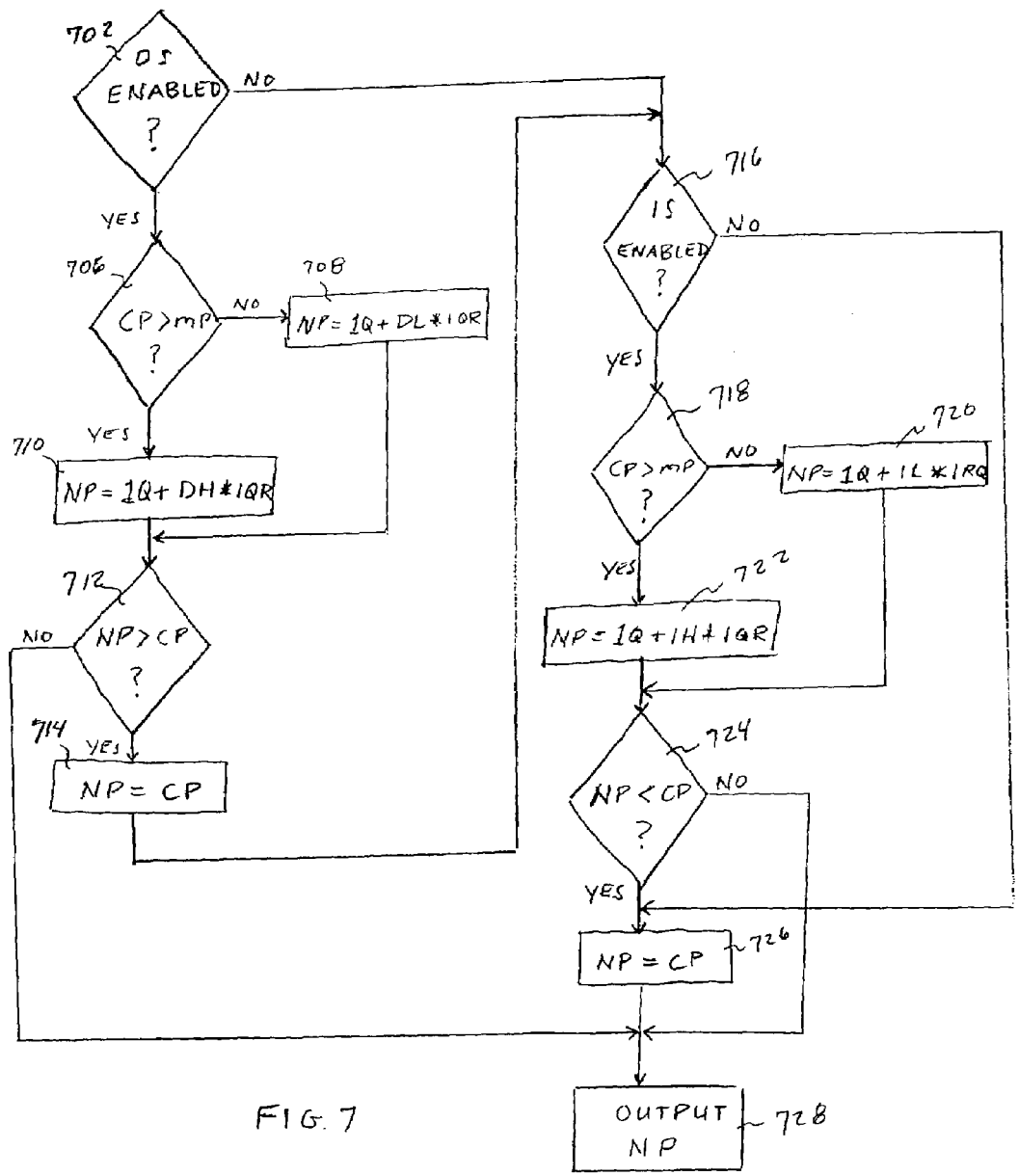
FIG. 7 is a flowchart showing the algorithm of the present invention in greater detail.

The basic algorithm of the method is illustrated in FIG. 7. Step 702 in FIG. 7 asks whether the decrease switch (DS) is enabled and, if not, then control goes to steps 716. If the decrease switch is enabled, step 706, which implements a decision as to whether the current price (CP) is greater than the median price (MP) calculated for the competitive products. If yes, then the new price is set to equal the first quartile price (1 Q) plus the decrease high factor (DH) multiplied by the IQR factor in step 710 and, if no, then the new price is set to equal the first quartile price (1Q) plus the decrease low factor (DL) multiplied by the IQR factor in step 708. Step 712 then asks whether the new price is greater than the current price and, if so, the new price is reset to equal the current price in step 714.

Step 716 asks whether the increase switch is enabled and, if not, the new price is output from the algorithm at step 728. If the increase switch is enabled, then step 718 asks whether the current price (CP) is greater than the median price (MP). If yes, then the new price is set to the first quartile (1Q) price plus the increase high (IH) factor multiplied by the IQR factor in step 722 and if no, then the new price is set to the first quartile (1Q) price plus the increase low (IL) factor multiplied by the IQR factor in step 720. If the new price is less than the current price (step 724) then the new price is reset to the current price at step 726. The new price is output at step 728. Advantageously, the new prices are input to a database from which a further cone plot is displayed and, if desired, the new pricing is automatically implemented.

Table 1 below shows a portion of the database for seven different parts, including the market values calculated from the prices of competitive products in the market (the individual prices are not shown due to space considerations). The table lists the part number, the classification of the part, the current price of the part and then the first, median, third quartile and IQR calculated from the prices for the competitive products.

TABLE 1

| Part # | Class | Current Price | 1Q | Median | 3Q | IQR* |
|---|---|---|---|---|---|---|
| 1 | F | $ 10.00 | $ 9.00 | $ 12.00 | $ 12.50 | $ 3.50 |
| 2 | F | $ 25.00 | $ 17.50 | $ 20.00 | $ 21.00 | $ 3.50 |
| 3 | F | $ 15.00 | $ 12.75 | $ 13.75 | $ 16.25 | $ 3.50 |
| 4 | L | $ 12.50 | $ 11.00 | $ 12.00 | $ 13.00 | $ 2.00 |
| 5 | L | $ 25.00 | $ 27.25 | $ 30.00 | $ 32.75 | $ 5.50 |
| 6 | P | $ 41.00 | $ 37.50 | $ 40.00 | $ 42.50 | $ 5.00 |
| 7 | P | $ 50.00 | $ 52.50 | $ 57.50 | $ 60.00 | $ 7.50 |

*IQR is equal to (3Q − 1Q)

In order to show the workings of the algorithm shown in FIG. 7, the algorithm will be applied herein to parts nos. 1, 2, 5 and 7. The decrease and increase settings (switches) and the high and low increase and decrease factors associated with the classifications shown in FIG. 6 will be used in these calculations.

For part no. 1, which is a competitive follower, since the decrease setting (DS) is enabled and since the current price CP ($10) is less than the median price MP ($12), the new price (NP) is set to equal the first quartile price (1Q) plus the decrease low factor (DL) multiplied by the IQR, i.e., NP=1Q+DL*IQR. Thus, the new price is set to $12.50. However, since the new price (NP) is greater than the current price (CP), the new price is reset to the current price of $10.00. Next, step 716 determines that the increase setting is enabled and, since CP<MP, NP=1Q+IL*IQR ($9.00). But the new price is reset to $10.00 because NP<CP in step 724, the new price is reset to the current price of $10.00.

For part no. 2, since the decrease setting is enabled and since CP ($25)>MP ($20), NP=1Q ($17.50)+DH (1)*IQR ($3.50), or $21.00. Since NP<CP, NP is left at $21.00.

Part no. 5 is a competitive leader part and, as shown in section 604 of FIG. 6, the increase high and increase low factors are both set to 0.5 and the decrease switch is off. Thus, because the decrease setting is off, the increase setting is on and CP ($25)<MP ($30), NP=27.25+(0.5*5.50), or $30.00. Since NP>CP, NP is left as is.

Part no. 7 is a captive publicity sensitive part and the factors for that classification are set and displayed in section 606 of panel 600 in FIG. 6. Since the DS is on and the CP<MP, NP=1Q +DL*IQR, or $55.50. Then, since NP>CP ($50), NP is reset to CP. Now, since IS is on and CP<MP, NP=1Q+IL*IQR, or $52.50. The new price is left at $52.50 because it is greater than the current price of $50.00.

When the algorithm of FIG. 7 is applied, the new prices for parts 3, 4 and 6 are determined to be $15, $12.50 and $42.50, respectively.

Figure 1:
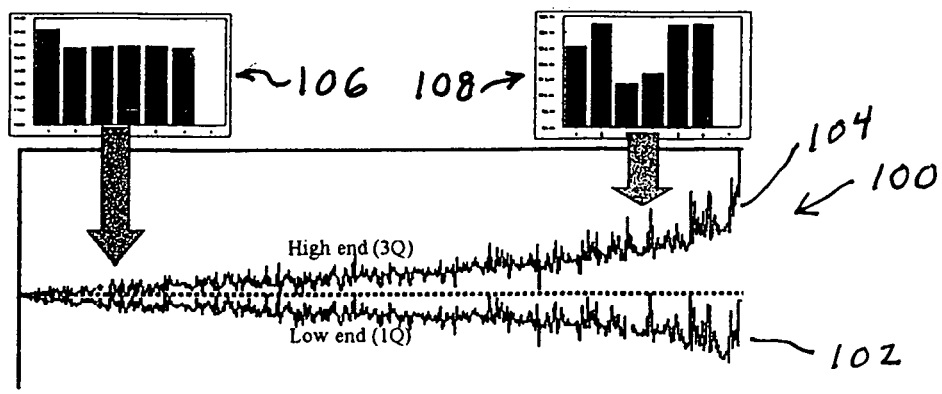
FIG. 1 depicts the $25^{th}$ and $75^{th}$ percentiles of market prices for a collection of a seller's products.
Figure 2:
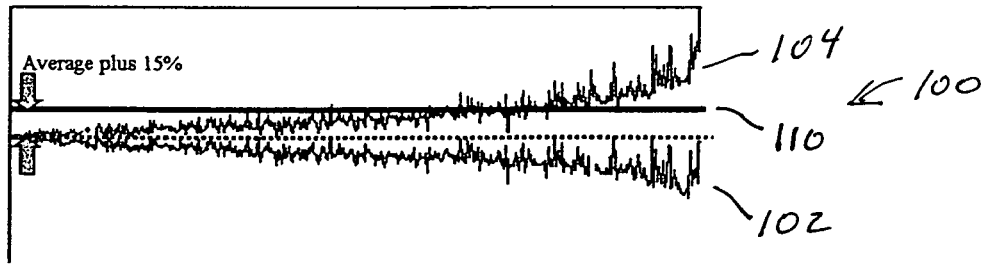
FIG. 2 depicts the graph of FIG. 1 with a line representing a rigid pricing policy imposed thereon.
Figure 3:
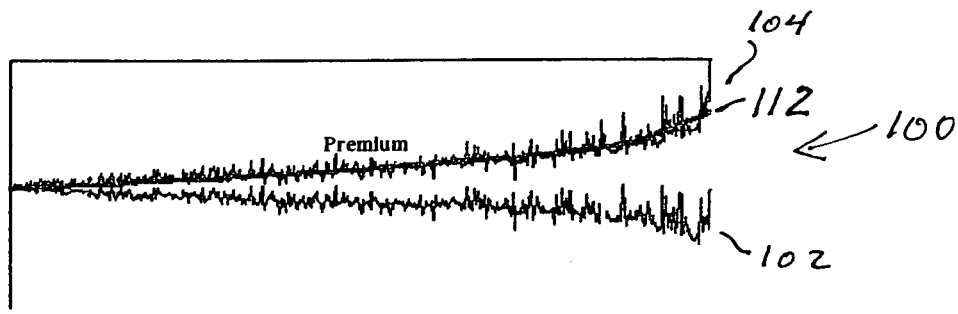
FIG. 3 depicts the graph of FIG. 1 with a line representing a first market-adapted pricing strategy in accordance with the present invention imposed thereon.
Figure 4:
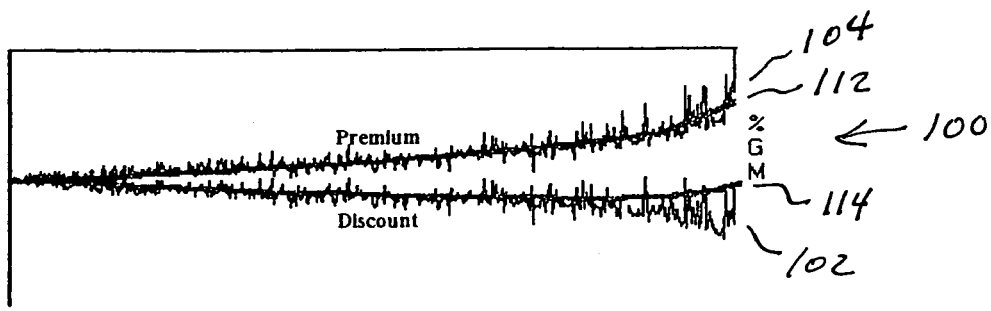
FIG. 4 depicts the graph of FIG. 1 with a line representing a second market-adapted pricing strategy in accordance with the present invention imposed thereon.
Figure 8:
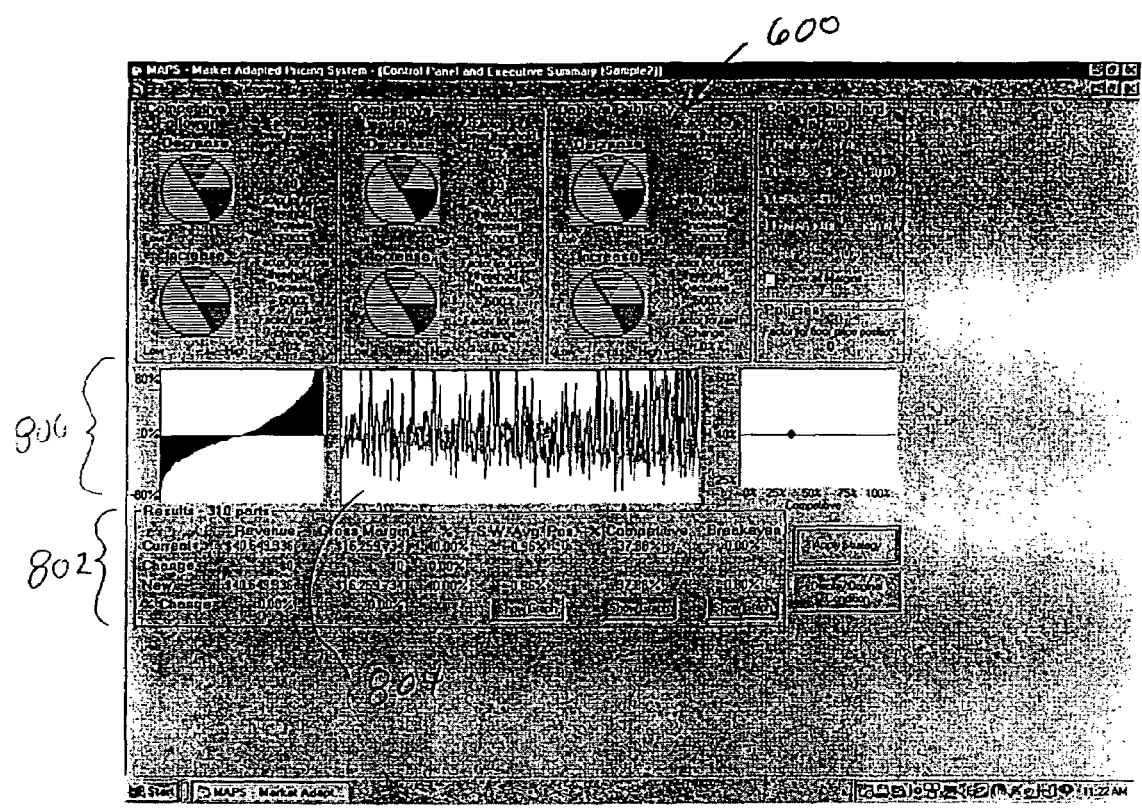
FIG. 8 shows a first graphical user interface (GUI) from one embodiment of the invention.
Figure 9:
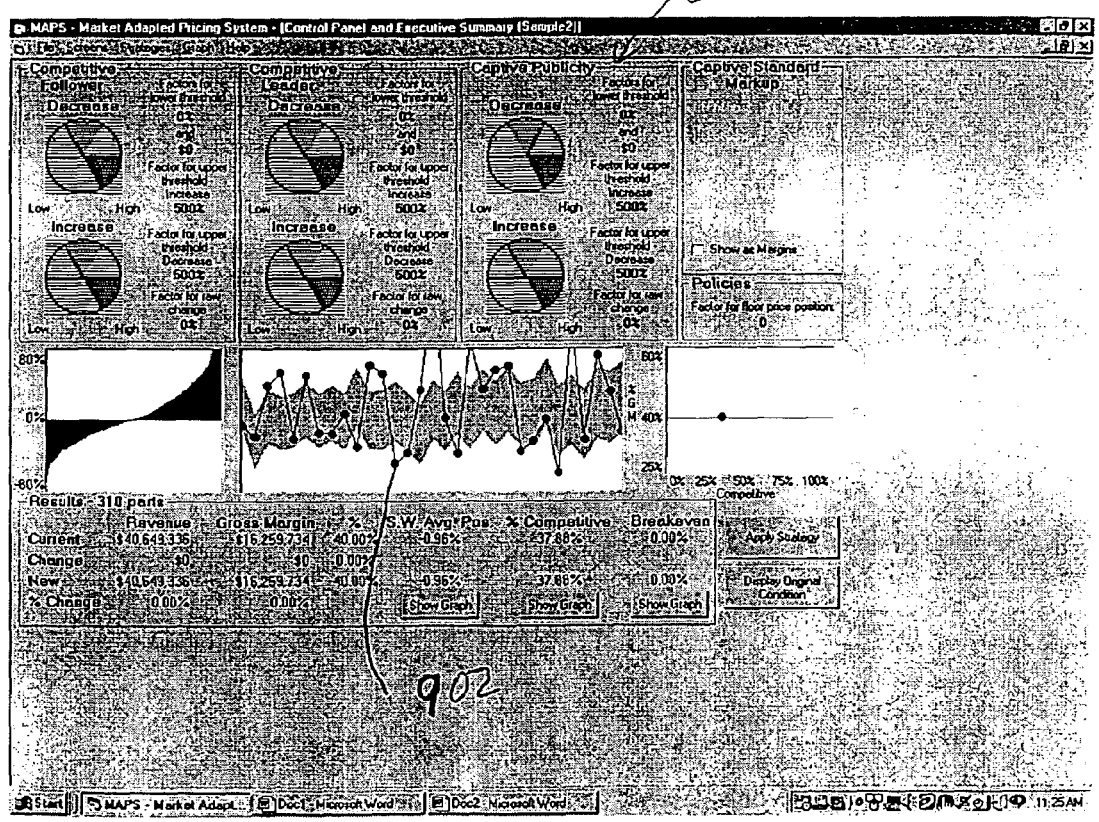
FIG. 9 shows a second graphical user interface (GUI) from the embodiment of the invention shown in FIG. 8.

In a preferred embodiment, along with the control panel shown in FIG. 6, the user's computer monitor also displays cone graphs similar to those shown in FIGS. 3 and 4, so that the user can visualize the pricing of its products in the marketplace, as shown in FIG. 8. It is noted that a host of additional statistical information is displayed below the graphs, shown as 802 in FIG. 8 to aid the user in understanding the results of the market-adapted price planning. Further graphical information is displayed at 806. Advantageously, a user can adjust the settings in control panel 600 and then run the algorithm using those settings. The results will automatically be displayed on the cone graph at 804. This feature allows the user to play with "what if" scenarios without ever having to actually change its prices in the marketplace. Further, as shown in FIG. 9, the user may zoom in on the cone graph to show the points representing its individual products. If the user clicks on a particular point, e.g., point 902, identifying data and other data concerning pricing of that product is displayed to the user.

Although the present invention has been described herein with respect to certain preferred embodiments, the descriptions herein should be considered exemplary and not limiting as various alternatives are possible and contemplated. The scope of the invention should be limited only by the claims.

I claim:

1. A computer-based method for setting market-adapted prices for prices for planning prices for a plurality of target products, said method comprising the following steps:

determining a current price for each target product of said plurality of target products;

obtaining market prices for a set of products competitive to each of said target products;

for each said set of products, calculating a first quartile price and a third quartile price and a percentage difference between said first and third quartile prices;

sorting, electronically, said first and third quartile prices for each product set based on said percentage difference between said first and third quartile prices;

displaying a graph of said sorted first and third quartile prices such that the first and third quartile pricing for said product sets having a smaller percentage difference are plotted on one end of the graph and said first and third quartile pricing for said product sets having a larger percentage difference are plotted on the other end of the graph; and setting prices, in a database, for each of said product sets based on said graph wherein the prices for the product sets are set closer to an average or median of the market prices of the competitive products for product sets having the smaller percentage difference and the prices for the product sets are set further from the average or median for product sets having the larger percentage difference.

2. A method as in claim 1, further comprising further displaying on said graph a plot of the price for each target product of said plurality of target products.

3. A computer-based method for performing market-adapted price planning for a plurality of target products in a market wherein market prices are published in advance, said method comprising the following steps:

determining a current price for each target product of said plurality of target products;

obtaining market prices for a set of competitive products competitive to each of said target products;

determining a range of prices for each of the competitive products;

correlating relative price sensitivity with the prices of the competitive products over said range wherein smaller differences between the prices of the competitive products indicate a higher sensitivity and larger differences between the prices of the competitive products indicate a lower sensitivity; and setting a new price, in a database, for each of said target products based on the range of prices for each of the competitive products and the correlated relative price sensitivity, wherein the prices for each target product are set by the computer closer to an average or median of the prices of the competitive products when the relative price sensitivity is high and are set by the computer further from said average or median when the relative price sensitivity is low.

4. A method as in claim 3 wherein different quartiles of the prices of the competitive products are selected based on whether the product is determined to be of a competitive leader price type or of a competitive follower price type.

5. A method as in claim 3, further comprising:

calculating quartile prices of said market prices for competitive products; and setting said new price for each of said target products based also on at least one of said quartile prices.

6. A method as in claim 5, wherein first and third quartile prices are calculated and at least one of the first and third quartile prices is used in determining said potential new price for each of said target products.

7. A method as in claim 6, wherein a further factor is calculated that represents the difference between said third quartile and said first quartile prices and said further factor is used in determining said new price for at least one of said target products.

8. A method as in claim 3, wherein product price types are allocated by a seller of said target products and wherein a first product price type comprises a competitive leader price type that identifies a product that the seller determines should generally be priced above other products in the market competitive thereto, and a second product price type comprises a competitive follower price type that identifies a product that the seller determines should generally be priced below other products in the market competitive thereto, and setting of the new price is further based on the product price types of the target products.

9. A method as in claim 8, wherein a third product price type comprises a captive price type that identifies a product having no significant direct competitors but whose price is constrained by similar products in the marketplace.

10. A method as in claim 3, wherein a set of pricing parameters is provided which comprises a decrease switch and at least one decrease factor, and the new price for each said target product is determined based on an algorithm wherein:

if said decrease switch is on, and if said current price is greater than said average or median price, said new price is set equal to a first quartile price plus a first decrease factor of said at least one decrease factors multiplied by a calculated factor representing the difference between the first quartile price and a third quartile price and, if said new price is less than said current price, said new price is reset to said current price.

11. A method as in claim 3 wherein a set of pricing parameters is provided which further comprises an increase switch and at least one increase factor, and wherein the new price for each said target product is determined based on an algorithm wherein:

if said increase switch is on, and if said current price is greater than said average or median price, said new price is set equal to a first quartile price plus a first increase factor of said at least one increase factor multiplied by a calculated factor representing the difference between the first quartile price and a third quartile price and, if said new price is greater than said current price, said new price is reset to said current price.

12. A method as in claim 10, wherein, in said algorithm, if said current price is less than said average or median price, said new price is set equal to said first quartile price plus a second decrease factor multiplied by said calculated factor and, if said new price is less than said current price, said new price is reset to said current price.

13. A method as in claim 11, wherein, in said algorithm, if said current price is less than said average or median price, said new price is set equal to said first quartile price plus a second decrease factor multiplied by said calculated factor and, if said new price is less than said current price, said new price is reset to said current price.

* * * * *